US011678092B2

(12) United States Patent
Li et al.

(10) Patent No.: US 11,678,092 B2
(45) Date of Patent: Jun. 13, 2023

(54) METHOD, APPARATUS AND SYSTEM FOR TRANSMITTING OMCI MESSAGES

(71) Applicant: Nokia Solutions and Networks Oy, Espoo (FI)

(72) Inventors: Jian Li, Shanghai (CN); Qin Yin, Shanghai (CN); Tinghui Zhang, Shanghai (CN)

(73) Assignees: Nokia Shanghai Bell Co., Ltd., Shanghai (CN); Nokia Solutions and Networks Oy, Espoo (FI)

( * ) Notice: Subject to any disclaimer, the term of this patent is extended or adjusted under 35 U.S.C. 154(b) by 69 days.

(21) Appl. No.: 17/137,740

(22) Filed: Dec. 30, 2020

(65) Prior Publication Data
US 2021/0211788 A1    Jul. 8, 2021

(30) Foreign Application Priority Data

Jan. 2, 2020  (CN) .......................... 202010002823.3

(51) Int. Cl.
*H04L 12/28* (2006.01)
*H04Q 11/00* (2006.01)
(Continued)

(52) U.S. Cl.
CPC ..... *H04Q 11/0067* (2013.01); *H04L 41/0213* (2013.01); *H04L 41/04* (2013.01);
(Continued)

(58) Field of Classification Search
CPC .... H04J 14/0223; H04L 1/0004; H04L 1/001; H04L 1/0079; H04L 41/0213;
(Continued)

(56) References Cited

U.S. PATENT DOCUMENTS 8,121,479 B2 * 2/2012 Effenberger ........ H04J 14/0232
398/43
9,032,209 B2 * 5/2015 Effenberger .......... H04L 9/0822
398/58
(Continued)

FOREIGN PATENT DOCUMENTS

CN         101854568 A     10/2010
WO    WO-2015/085559 A1    6/2015

OTHER PUBLICATIONS

G.988, Series G: Transmission Systems and Media, Digital Systems and Networks Digital sections and digital line system—Optical line systems for local and access networks ONU management and control interface (OMCI) specification, ITU-T, 670 pages, Nov. 2017.*

(Continued)

*Primary Examiner* — Frank Duong
(74) *Attorney, Agent, or Firm* — Harness, Dickey & Pierce, P.L.C.

(57) ABSTRACT

The system includes an optical line terminal, a cloud server and an optical network terminal, wherein, the optical line terminal includes a part of management entities supported by the OMCI protocol, the part of management entities is associated with device information of the optical line terminal, the cloud server supports virtual OMCI, and the cloud server includes another part of management entities supported by the OMCI protocol. According to the scheme of the disclosure, by retaining a part of MEs supported by the OMCI protocol which is associated with the device information of OLT in OLT, and deploying another part of MEs supported by the OMCI protocol in the cloud server, it can reduce or avoid the dependency of the vOMCI on the OLT device while the vOMCI is realized to reduce the complexity (Continued)

of the OLT device and improve the flexibility of deploying the OMCI protocol stack of different service providers.

12 Claims, 3 Drawing Sheets

(51) Int. Cl.
    *H04L 41/0213*     (2022.01)
    *H04L 67/1095*     (2022.01)
    *H04L 41/04*     (2022.01)
    *H04L 41/0803*     (2022.01)

(52) U.S. Cl.
    CPC ...... *H04L 41/0803* (2013.01); *H04L 67/1095* (2013.01); *H04Q 2011/0079* (2013.01)

(58) Field of Classification Search
    CPC . H04L 41/04; H04L 41/0803; H04L 65/1101; H04L 67/10; H04L 67/1095; H04L 69/08; H04L 69/085; H04L 69/16; H04L 69/18; H04L 69/24; H04Q 11/0062; H04Q 11/0067; H04Q 2011/0079; H04Q 2011/0088
    See application file for complete search history.

(56) References Cited

U.S. PATENT DOCUMENTS

| 9,270,480 | B1* | 2/2016 | Som de Cerff | ....... H04L 41/344 |
| 2009/0154920 | A1 | 6/2009 | Yang | |
| 2019/0306018 | A1* | 10/2019 | Steverson | ........... H04L 41/0806 |

OTHER PUBLICATIONS

Office Action for Chinese Application No. 202010002823.3 dated Aug. 3, 2022.

* cited by examiner

METHOD, APPARATUS AND SYSTEM FOR TRANSMITTING OMCI MESSAGES

CROSS-REFERENCE TO RELATED APPLICATIONS

The present application claims priority under 35 U.S.C. § 119 to Chinese Patent Application No. 202010002823.3, filed on Jan. 2, 2020, in the European Patent Office, the entire contents of each of which are hereby incorporated by reference.

TECHNICAL FIELD

The present disclosure relates to the field of circuit technologies, and in particular relates to a technical scheme for transmitting OMCI (Optical Network Unit Management and Control Interface) messages.

BACKGROUND

OMCI is a configuration transmission channel defined in a GPON (Gigabit-Capable Passive Optical network) standard, and is used for management and control of ONT (Optical Network Terminal) by OLT (Optical line terminal) in the GPON network.

In the prior art, the OMCI protocol stack is deployed in OLT. The WT-451 is discussing the vOMCI (virtual OMCI) function, which will move the OMCI protocol stack out of the OLT device and deploy it in the cloud, and since most of ME (Managed Entity) contents supported by the OMCI protocol are directly from the configuration of the operators, deploying the OMCI protocol stack in the cloud can reduce the complexity of the OLT device and improve the flexibility of different operators to deploy the OMCI protocol stack. However, the vOMCI is still at beginning stage at present, and all MEs supported by the OMCI protocol should be implemented in the vOMCI function as discussed so far.

SUMMARY

The object of the present disclosure is to provide a method, apparatus and system for transmitting OMCI messages for vOMCI.

According to one aspect of the present disclosure, there is provided a method for transmitting OMCI messages in an optical line terminal, wherein the optical line terminal comprises a part of management entities supported by the OMCI protocol, the part of management entities is associated with the device information of the optical line terminal, a cloud server supports the virtual OMCI, the cloud server comprises another part of management entities supported by the OMCI protocol, the method comprising:

obtaining an OMCI message to be sent, wherein the OMCI message is generated by the optical line terminal according to one or more management entities in the part of management entities, or the OMCI message is generated by the cloud server according to one or more management entities in the another part of management entities;

sending the OMCI message to an optical network terminal.

According to another aspect of the present disclosure, there is provided a method for transmitting OMCI messages in a cloud server, wherein an optical line terminal comprises a part of management entities supported by the OMCI protocol, the part of management entities is associated with device information of the optical line terminal, the cloud server supports the virtual OMCI, and the cloud server comprises another part of management entities supported by the OMCI protocol, the method comprising:

generating an OMCI message to be sent according to one or more management entities in the another part of management entities, and sending the OMCI message to the optical line terminal.

According to another aspect of the present disclosure, there is provided a first apparatus for transmitting OMCI messages in an optical line terminal, wherein the optical line terminal comprises a part of management entities supported by the OMCI protocol, the part of management entities is associated with the device information of the optical line terminal, a cloud server supports the virtual OMCI, the cloud server comprises another part of management entities supported by the OMCI protocol, the first apparatus comprising:

means for obtaining an OMCI message to be sent, wherein the OMCI message is generated by the optical line terminal according to one or more management entities in the part of management entities, or the OMCI message is generated by the cloud server according to one or more management entities in the another part of management entities;

means for sending the OMCI message to an optical network terminal.

According to another aspect of the present disclosure, there is provided a second apparatus for transmitting OMCI messages in a cloud server, wherein an optical line terminal comprises a part of management entities supported by the OMCI protocol, the part of management entities is associated with device information of the optical line terminal, the cloud server supports the virtual OMCI, and the cloud server comprises another part of management entities supported by the OMCI protocol, the second apparatus comprising:

means for generating an OMCI message to be sent according to one or more management entities in the another part of management entities, and sending the OMCI message to the optical line terminal.

According to another aspect of the present disclosure, there is provided a system for transmitting OMCI messages, wherein the system comprises the optical line terminal, the cloud server and the optical network terminal, the optical line terminal comprises the first apparatus of the present disclosure, and the cloud server comprises the second apparatus of the present disclosure; wherein the optical line terminal comprises a part of management entities supported by the OMCI protocol, the part of management entities is associated with device information of the optical line terminal, the cloud server supports virtual OMCI, and the cloud server comprises another part of management entities supported by the OMCI protocol.

According to another aspect of the present disclosure, there is provided a device, wherein the device comprising:

a memory for storing one or more programs;

one or more processors connected with the memory, the one or more programs, when executed by the one or more processors, cause the one or more processors to execute the method for transmitting OMCI messages described in the present a disclosure.

According to another aspect of the present disclosure, there is provided a computer readable storage medium storing a computer program, which when executed by a processor, cause the processor to perform the method for transmitting OMCI messages described in the present disclosure.

Compared with the prior art, the present disclosure has the following advantages: by retaining a part of MEs supported by the OMCI protocol which is associated with the device information of OLT in OLT, and deploying another part of MEs supported by the OMCI protocol in the cloud server, it can reduce or avoid the dependency of the vOMCI on the OLT device while the vOMCI is realized to reduce the complexity of the OLT device and improve the flexibility of deploying the OMCI protocol stack of different service providers.

BRIEF DESCRIPTION OF THE DRAWINGS

Other features, objectives, and advantages of the present disclosure will become more apparent through reading the following detailed depiction of the non-limitative embodiments with reference to the accompanying drawings.

Same or similar reference numbers in the drawings represent the same or similar components.

DETAILED DESCRIPTION

Figure 1:
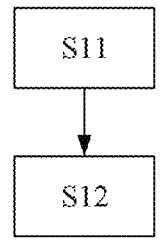
FIG. 1 shows a flowchart of a method for transmitting OMCI messages in an optical line terminal according to an embodiment of the present disclosure.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when its operations are completed, but may also have additional steps not included in the figure. The processes may correspond to methods, functions, procedures, subroutines, subprograms, etc.

The "device" mentioned in this context refers to the smart electronic device that can carry out numerical computations and/or logical computations and other predetermined processing procedures through running predetermined programs or instructions, and may comprise a processor and a memory. It is by the processor that the program instructions prestored in the memory are executed to carry out the predetermined processing procedures, or by Application Specific Integrated Circuit (ASIC), Field Programmable Gate Array (FPGA), Digital Signal Processor (DSP) and other like hardware that the predetermined processing procedures are carried out, or some combination of the two mentioned scenarios.

The methods (some of which are showed by flowcharts) discussed infra may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. The present disclosure, however, may be specifically implemented through many alternative embodiments, and should not be construed as limited to only the embodiments illustrated here.

It will be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Hereinafter, further detailed description will be made to the present disclosure with reference to the accompanying drawings.

FIG. 1 shows a flowchart of a method for transmitting OMCI messages in an optical line terminal according to an embodiment of the present disclosure. Wherein, the optical line terminal comprises a part of management entities supported by the OMCI protocol, the part of management entities is associated with the device information of the optical line terminal, a cloud server supports the virtual OMCI, the cloud server comprises another part of management entities supported by the OMCI protocol; that is, a part of the management entities supported by the OMCI protocol are retained in the OLT device, and another part of the management entities are removed from the OLT device and deployed in the cloud server. Wherein, the management entity associated with the device information of the optical line terminal indicates that the content of the management entity is closely related to the device information of the optical line terminal or needs to be determined by the device information of the optical line terminal, and optionally, the management entity associated with the device information of the optical line terminal includes, but is not limited to, a management entity that needs to retrieve information from the OLT device side, a management entity that needs to update information at the OLT device side, and the like; for example, the management entity OLT-G, its content "time and day information" needs specified GEM (GPON Encapsulation Mode) superframe information, the GEM superframe information can only be retrieved from the OLT device, the OLT-G is the management entity that associated with the device information of the OLT. In some embodiments, the part of management entities includes all management entities associated with the device information of the optical line terminal, and based on this, the dependency of the vOMCI on the OLT device can be eliminated. In other embodiments, the part of management entities includes a part of management entities associated with the device information of the optical line terminal, for example, the management entities having an association degree higher than a predetermined association degree with the device information of the optical line terminal are retained in the OLT device, or the management entities associated with the device information of the optical line terminal and having a high frequency of use are retained in the OLT device, so that a balance between reducing dependency of the vOMCI on the OLT device and reducing complexity of the OLT device can be achieved. In some embodiments, a complete OMCI protocol stack is deployed in the cloud server to support virtual vOMCI functions. In some embodiments, the OLT may have a complete OMCI protocol stack reserved therein, or may support only partial OMCI functions (e.g., only have some simple OMCI message sending and receiving functions); in practical applications, the OMCI functions supported in the OLT may be designed based on practical requirements.

The method according to the present embodiment includes step S11 and step S12. In step S11, the optical line terminal obtains an OMCI message to be sent, wherein the OMCI message is generated by the optical line terminal according to one or more management entities in the part of management entities, or the OMCI message is generated by the cloud server according to one or more management entities in the another part of management entities; in step S12, the optical line terminal sends the OMCI message to an optical network terminal.

In step S11, the optical line terminal obtains an OMCI message to be sent. In some embodiments, the OLT receives an OMCI message from the cloud server, wherein the OMCI message is generated by the cloud server according to one or more management entities in the another part of management entities, that is, the cloud server generates an OMCI message to be sent according to one or more management entities that need to be sent to the ONT in the another part of management entities stored therein, and sends the OMCI message to the OLT, and then the OLT receives the OMCI message from the cloud server. In some embodiments, the OLT generates the OMCI message to be sent according to one or more management entities that need to be sent to the ONT in the part of the management entities stored therein, wherein the OLT may determine the one or more management entities that need to be sent to the ONT in the part of the management entities in any feasible manner, which is not limited in this disclosure.

In step S12, the optical line terminal sends the OMCI message to an optical network terminal to manage and control the optical network terminal.

In some embodiments, the step S11 includes: obtaining OMCI control information, wherein the OMCI control information is used for indicating one or more management entities in the part of management entities which need to be sent; and generating an OMCI message to be sent according to one or more management entities indicated by the OMCI control information. Wherein the OMCI control information includes any information for controlling the transmission of OMCI message; optionally, the OMCI control information includes, but is not limited to, the identification information corresponding to one or more MEs, the transmission control information for controlling the transmission of OMCI message, and the like, the transmission control information includes, for example, transmission mode, transmission frequency, transmission condition, and the like. Optionally, the OMCI control information may come from the cloud server, the inside of the optical line terminal, or another management device connected to the optical line terminal, and the OMCI control information may also be obtained through a private negotiation manner. In some embodiments, the OLT receives OMCI control information from the cloud server, wherein the OMCI control information indicates one or more management entities in the part of the management entities which need to be sent; that is, the cloud server controls the OMCI function in the OLT (e.g., which ME(s) to send and how to send); alternatively, the OMCI control information may be transmitted between the cloud server and the OLT based on any feasible manner, such as using RPC (Remote Procedure Call) as a channel, in practical applications, the OMCI control information transmitted between the cloud server and the OLT may be designed based on practical requirements. In other embodiments, the OLT obtains OMCI control information provided by a protocol other than the OMCI in the optical line terminal, or obtains OMCI control information pre-stored in the optical line terminal, so that the OLT can decide how to send the OMCI to the ONT based on the obtained OMCI control information; that is, the OLT is self-controlled, it can self-operated control the OMCI message that needs to be sent to the ONT and how to send it based on the OMCI control information obtained from inside the OLT. In some embodiments, the OLT device obtains the content information corresponding to one or more management entities according to the one or more management entities indicated by the OMCI control information, in combination with the device information of the OLT device, and then encapsulates the content information according to the OMCI protocol format to obtain the OMCI message to be sent.

It should be noted that in the solution of the present disclosure supports the cloud server to increase the synchronous count of MIB (Management Information Base) data, and also supports the optical line terminal to increase the synchronous count of MIB data, that is, the synchronous count of MIB data is centralized and implemented by the cloud server or the optical line terminal. In some embodiments, the OMCI function in the OLT is controlled by the cloud server, and MIB data synchronization counts are incremented by the cloud server; since the cloud server knows the detailed information of the OMCI messages generated by itself and transmitted to the ONT, and also knows the detailed information of the OMCI messages generated by the OLT according to the OMCI control information from the cloud server and transmitted to the ONT, the cloud server can easily know how to increase the MIB data synchronization count. In other embodiments, the OMCI function in the OLT is controlled by the cloud server, and the MIB data synchronization count is increased by the OLT; since the OLT can know the detailed information of the OMCI messages generated by the cloud server and transmitted to the ONT and also know the detailed information of the OMCI messages generated by the OLT according to the OMCI control information from the cloud server and transmitted to the ONT, the OLT can also easily know how to increase the MIB data synchronization count; alternatively, when the OMCI function in the OLT is controlled by the cloud server, the cloud server may determine a total number of MEs (i.e., the sum of the number of MEs configured by the cloud server and the number of MEs configured by the OLT) transmitted to the ONT and transmit the number of MEs to the OLT so that the OLT can increase the MIB data synchronization count directly according to the number of MEs. In other embodiments, the OLT is self-controlled, and the MIB data synchronization count is increased by the OLT, the method further includes: the OLT generates synchronization related information according to the obtained OMCI control information, and sends the synchronization related information to the cloud server; wherein the synchronization related information includes any information related to MIB data synchronization count, such as the number of MEs included in the OMCI messages generated by the OLT, detailed information of the OMCI messages generated by the OLT, and the like; since the cloud server knows the detailed information of the OMCI messages generated by the cloud server and sent to the ONT, the cloud server may increase the MIB data synchronization count according to the detailed information in combination with the synchronization related information from the OLT. In other embodiments, the OLT is self-controlled, and the MIB data synchronization count is increased by the OLT, specifically, the OLT controls to increase the MIB data synchronization count according to OCMI messages generated by the optical line terminal and OMCI messages generated by the cloud server; since the OLT can know the detailed information of the OMCI messages generated by the cloud server and transmitted to the ONT and also know the detailed information of the OMCI messages generated by the OLT according to the OMCI control information from the cloud server and transmitted to the ONT, the OLT can also easily know how to increase the MIB data synchronization count; alternatively, when the OLT is self-controlled, the cloud server may determine the number of MEs configured by the cloud server and transmit the number of MEs to the OLT, so that the OLT can increase the MIB data synchronization count according to the number of MEs and the number of MEs configured by the OLT.

In some embodiments, the method further comprises: the OLT receives an OMCI response message from the optical network terminal; the OLT obtains object identification information corresponding to the OMCI response message, and sends the OMCI response message to an object indicated by the object identification information according to the object identification information. The object identification information is used to identify an object to which the OMCI response message responds, and it should be understood that the object to which the OMCI response message responds is also the source of the request (OMCI message) corresponding to the OMCI response message, and in some embodiments, the object may be an OLT, a module or unit in an OLT, the cloud server or a module or unit in the cloud server; in some embodiments, if an OMCI message is generated by the OLT according to one or more management entities in the part of management entities in the OLT, the object indicated by object identification information corresponding to an OMCI response message received by the OLT for the OMCI message is the OLT or a certain module/unit in the OLT; in some embodiments, if an OMCI message is generated by the cloud server according to one or more management entities in the another part of the management entities in the cloud server, the object indicated by the object identification information corresponding to the OMCI response message received by the OLT for the OMCI message is the cloud server or a certain module/unit in the cloud server. In some embodiments, the OLT extracts a transaction correlation identifier in the OMCI response message, and determines the transaction correlation identifier as the object identification information; the transaction correlation identifier (TCID) is a field in a message based on the OMCI protocol, and the value of this field in a set of corresponding request and response messages must be consistent, that is, an OMCI message and an OMCI response message for the OMCI message contain the same transaction correlation identifier, so that the OLT can determine, according to the transaction correlation identifier in the OMCI response message, whether the OMCI response message is a response to the OMCI message generated by the OLT or a response to the OMCI message generated by the cloud server, that is, the ONT can determine, according to the transaction correlation identifier in the OMCI response message, whether to send the OMCI response message to a corresponding unit of the OLT for processing or to send the OMCI response message to the cloud server for processing. In some embodiments, the OLT extracts the object identification information from other fields of the OMCI response message except the TCID, if a new field is added to the OMCI response message format defined by the original OMCI protocol to characterize the object identification information, the content in the new field may be extracted from the received OMCI response message to obtain the object identification information, and if a field in the OMCI response message format defined by the original OMCI protocol is used to carry the object identification information, the object identification information carried by the field may be obtained from the field of the received OMCI response message. In some embodiments, the OLT determines the object identification information based on information other than the OMCI response message, or obtains the object identification information from other elements in the OLT. It should be noted that, the above implementation manner for obtaining the object identification information is only examples and not a limitation of the present disclosure, and those skilled in the art should understand that any implementation manner used in the OLT for obtaining the object identification information corresponding to the OMCI response message to determine which object the OMCI response message should be sent to should be included in the scope of the present disclosure.

Figure 2:
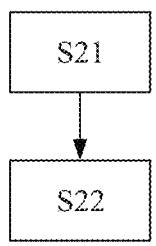
FIG. 2 shows a flowchart of a method for transmitting OMCI messages in a cloud server according to an embodiment of the present disclosure.

FIG. 2 shows a flowchart of a method for transmitting OMCI messages in a cloud server according to an embodiment of the present disclosure. Wherein, the optical line terminal comprises a part of management entities supported by the OMCI protocol, the part of management entities is associated with the device information of the optical line terminal, a cloud server supports the virtual OMCI and comprises another part of management entities supported by the OMCI protocol. Wherein, the cloud server and the optical line terminal are already described in detail in the embodiment shown in FIG. 1, and are not described herein again.

The method according to the present embodiment includes step S21 and step S22. In step S21, the cloud server generates an OMCI message to be sent according to one or more management entities in said another part of management entities; in step S22, the cloud server sends the OMCI message to the optical line terminal.

In step S21, the cloud server generates an OMCI message to be sent according to one or more of said another part of the management entities. Specifically, the cloud server, according to one or more management entities in said another part of management entities stored in the cloud server, obtains the content information corresponding to the one or more management entities and then encapsulates the content information according to the OMCI protocol format to obtain the OMCI message to be sent.

In step S22, the cloud server sends the OMCI message to the optical line terminal, so as to send the OMCI message to the optical network terminal through the optical line terminal.

In some embodiments, the method further comprises: the cloud server generates OMCI control information and sends the OMCI control information to the optical line terminal, wherein the OMCI control information is used for indicating one or more management entities in the part of management entities which need to be sent, so that the optical line terminal generates OMCI messages to be sent according to the one or more management entities indicated by the OMCI control information. In these embodiments, the OMCI function in the optical line terminal is controlled by the cloud server, that is, which MEs in the part of the management entity in the OLT need to be sent and how to send are controlled by the cloud server. The OMCI control information is already described in detail in the embodiment shown in FIG. 1, and is not described herein again. As one example, the cloud server generates OMCI control information for indicating to send ME1 and the sending frequency is f1; then the cloud server sends the OMCI control information to the OLT, so that the OLT generates an OMCI message comprising ME1 content according to the OMCI control information. Alternatively, the OMCI control information may be transmitted between the cloud server and the OLT based on any feasible manner, such as using RPC (Remote Procedure Call) as a channel, and in practical applications, the OMCI control information transmitted between the cloud server and the OLT may be designed based on practical requirements.

In some embodiments, when the OMCI function in the optical line terminal is controlled by the cloud server, the method further includes: the cloud server controls to increase the synchronous counting of MIB data according to the OMCI message and the OMCI control information sent from the cloud server to the optical line terminal. As an example, the cloud server determines a first ME number configured by the cloud server according to the OMCI message sent from the cloud server to the optical line terminal, and determines a second ME number configured by the OLT according to the OMCI control information sent to the OLT, and a total ME number sent to the ONT can be obtained by summing the first ME number and the second ME number, and then the cloud server can increase the synchronization count of MIB data based on the total ME number. It should be noted that, when the OMCI function in the optical line terminal is controlled by the cloud server, the synchronization count of MIB data may also be increased by the OLT, this implementation is already described in detail in the embodiment shown in FIG. 1 and will not be repeated here.

In some embodiments, the OLT is self-controlled, the method further comprising: the cloud server receives synchronization related information from the optical line terminal; the cloud server controls to increase the synchronous count of MIB data according to the OMCI message and the synchronous related information sent to the optical line terminal by the cloud server. The synchronization related information is already detailed in the embodiment shown in FIG. 1, and is not described herein again. As an example, the cloud server receives synchronization related information from the OLT, the synchronization related information is used for indicating that the number of MEs configured by the OLT and sent to the ONT is M1, the cloud server determines that the number of MEs configured by the cloud server and sent to the ONT is M2 according to the OMCI message sent to the OLT by the cloud server, and then the cloud server controls to increase the synchronization count of MIB data according to M1 and M2. It should be noted that, when the OLT is self-controlled, the synchronization count of MIB data may also be increased by the OLT, and this implementation is already described in detail in the embodiment shown in FIG. 1, and will not described here again.

In some embodiments, the method further comprises: the cloud server receives an OMCI response message sent by the optical line terminal, wherein an object indicated by the object identification information corresponding to the OMCI response message is the cloud server. In some embodiments, the object indicated by the object identification information corresponding to the OMCI response message is a certain module or unit in the cloud server. The object identification information is already described in detail in the embodiment shown in FIG. 1, and will not described herein again.

According to the scheme of the disclosure, by retaining a part of MEs supported by the OMCI protocol which is associated with the device information of OLT in OLT, and deploying another part of MEs supported by the OMCI protocol in the cloud server, it can reduce or avoid the dependency of the vOMCI on the OLT device while the vOMCI is realized to reduce the complexity of the OLT device and improve the flexibility of deploying the OMCI protocol stack of different service providers.

Figure 3:
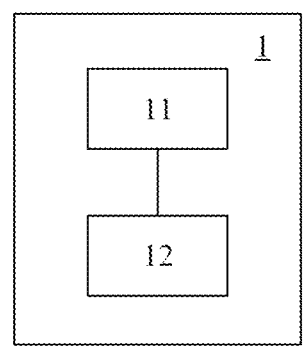
FIG. 3 shows a structural diagram of a first apparatus for transmitting OMCI messages in an optical line terminal according to an embodiment of the present disclosure.

FIG. 3 shows a structural diagram of a first apparatus for transmitting OMCI messages in an optical line terminal according to an embodiment of the present disclosure. Wherein, the optical line terminal comprises a part of management entities supported by the OMCI protocol, the part of management entities is associated with the device information of the optical line terminal, a cloud server supports the virtual OMCI, the cloud server comprises another part of management entities supported by the OMCI protocol; that is, a part of the management entities supported by the OMCI protocol are retained in the OLT device, and another part of the management entities are removed from the OLT device and deployed in the cloud server. Wherein, the management entity associated with the device information of the optical line terminal indicates that the content of the management entity is closely related to the device information of the optical line terminal or needs to be determined by the device information of the optical line terminal, and optionally, the management entity associated with the device information of the optical line terminal includes, but is not limited to, a management entity that needs to retrieve information from the OLT device side, a management entity that needs to update information at the OLT device side, and the like; for example, the management entity OLT-G, its content "time and day information" needs specified GEM (GPON Encapsulation Mode) superframe information, the GEM superframe information can only be retrieved from the OLT device, the OLT-G is the management entity that associated with the device information of the OLT. In some embodiments, the part of management entities includes all management entities associated with the device information of the optical line terminal, and based on this, the dependency of the vOMCI on the OLT device can be eliminated. In other embodiments, the part of management entities includes a part of management entities associated with the device information of the optical line terminal, for example, the management entities having an association degree higher than a predetermined association degree with the device information of the optical line terminal are retained in the OLT device, or the management entities associated with the device information of the optical line terminal and having a high frequency of use are retained in the OLT device, so that a balance between reducing dependency of the vOMCI on the OLT device and reducing complexity of the OLT device can be achieved. In some embodiments, a complete OMCI protocol stack is deployed in the cloud server to support virtual vOMCI functions. In some embodiments, the OLT may have a complete OMCI protocol stack reserved therein, or may support only partial OMCI functions (e.g., only have some simple OMCI message sending and receiving functions); in practical applications, the OMCI functions supported in the OLT may be designed based on practical requirements.

In this embodiment, the first apparatus includes a first obtaining means 11 and a first sending means 12. The first obtaining means 11 is used to obtain an OMCI message to be sent, wherein the OMCI message is generated by the optical line terminal according to one or more management entities in the part of management entities, or the OMCI message is generated by the cloud server according to one or more management entities in the another part of management entities; the first sending means 12 is used to send the OMCI message to an optical network terminal.

The first obtaining means 11 is used to obtain an OMCI message to be sent. In some embodiments, the first obtaining means 11 receives an OMCI message from the cloud server, wherein the OMCI message is generated by the cloud server according to one or more management entities in the another part of management entities, that is, the cloud server generates an OMCI message to be sent according to one or more management entities that need to be sent to the ONT in the another part of management entities stored therein, and sends the OMCI message to the OLT, and then the first obtaining means 11 in the OLT receives the OMCI message from the cloud server. In some embodiments, the first obtaining means 11 generates the OMCI message to be sent according to one or more management entities that need to be sent to the ONT in the part of the management entities stored in the OLT, wherein the first obtaining means 11 may determine the one or more management entities that need to be sent to the ONT in the part of the management entities in any feasible manner, which is not limited in this disclosure.

The first sending means 12 is used to send the OMCI message to an optical network terminal to manage and control the optical network terminal.

In some embodiments, the first obtaining means 11 is used for: obtaining OMCI control information, wherein the OMCI control information is used for indicating one or more management entities in the part of management entities which need to be sent; and generating an OMCI message to be sent according to one or more management entities indicated by the OMCI control information. Wherein the OMCI control information includes any information for controlling the transmission of OMCI message; optionally, the OMCI control information includes, but is not limited to, the identification information corresponding to one or more MEs, the transmission control information for controlling the transmission of OMCI message, and the like, the transmission control information includes, for example, transmission mode, transmission frequency, transmission condition, and the like. Optionally, the OMCI control information may come from the cloud server, the inside of the optical line terminal, or another management device connected to the optical line terminal, and the OMCI control information may also be obtained through a private negotiation manner. In some embodiments, the first obtaining means 11 receives OMCI control information from the cloud server, wherein the OMCI control information indicates one or more management entities in the part of the management entities which need to be sent; that is, the cloud server controls the OMCI function in the OLT (e.g., which ME(s) to send and how to send); alternatively, the OMCI control information may be transmitted between the cloud server and the OLT based on any feasible manner, such as using RPC (Remote Procedure Call) as a channel, in practical applications, the OMCI control information transmitted between the cloud server and the OLT may be designed based on practical requirements. In other embodiments, the first obtaining means 11 obtains OMCI control information provided by a protocol other than the OMCI in the optical line terminal, or obtains OMCI control information pre-stored in the optical line terminal, so that the first obtaining means 11 can decide how to send the OMCI to the ONT based on the obtained OMCI control information; that is, the OLT is self-controlled, it can self-operated control the OMCI message that needs to be sent to the ONT and how to send it based on the OMCI control information obtained from inside the ONT. In some embodiments, the first obtaining means 11 obtains the content information corresponding to one or more management entities according to the one or more management entities indicated by the OMCI control information, in combination with the device information of the OLT device, and then encapsulates the content information according to the OMCI protocol format to obtain the OMCI message to be sent.

It should be noted that in the solution of the present disclosure supports the cloud server to increase the synchronous count of MIB data, and also supports the optical line terminal to increase the synchronous count of MIB data, that is, the synchronous count of MIB data is centralized and implemented by the cloud server or the optical line terminal. In some embodiments, the OMCI function in the OLT is controlled by the cloud server, and MIB data synchronization counts are incremented by the cloud server; since the cloud server knows the detailed information of the OMCI messages generated by itself and transmitted to the ONT, and also knows the detailed information of the OMCI messages generated by the OLT according to the OMCI control information from the cloud server and transmitted to the ONT, the cloud server can easily know how to increase the MIB data synchronization count. In other embodiments, the OMCI function in the OLT is controlled by the cloud server, and the MIB data synchronization count is increased by the OLT; since the OLT can know the detailed information of the OMCI messages generated by the cloud server and transmitted to the ONT and also know the detailed information of the OMCI messages generated by the OLT according to the OMCI control information from the cloud server and transmitted to the ONT, the OLT can also easily know how to increase the MIB data synchronization count; alternatively, when the OMCI function in the OLT is controlled by the cloud server, the cloud server may determine a total number of MEs (i.e., the sum of the number of MEs configured by the cloud server and the number of MEs configured by the OLT) transmitted to the ONT and transmit the number of MEs to the OLT so that the OLT can increase the MIB data synchronization count directly according to the number of MEs. In other embodiments, the OLT is self-controlled, and the MIB data synchronization count is increased by the OLT, the first apparatus 1 further means for generating synchronization related information according to the obtained OMCI control information, and sends the synchronization related information to the cloud server; wherein the synchronization related information includes any information related to MIB data synchronization count, such as the number of MEs included in the OMCI messages generated by the OLT, detailed information of the OMCI messages generated by the OLT, and the like; since the cloud server knows the detailed information of the OMCI messages generated by the cloud server and sent to the ONT, the cloud server may increase the MIB data synchronization count according to the detailed information in combination with the synchronization related information from the OLT. In other embodiments, the OLT is self-controlled, and the MIB data synchronization count is increased by the OLT, specifically, the OLT controls to increase the MIB data synchronization count according to OCMI messages generated by the optical line terminal and OMCI messages generated by the cloud server; since the OLT can know the detailed information of the OMCI messages generated by the cloud server and transmitted to the ONT and also know the detailed information of the OMCI messages generated by the OLT according to the OMCI control information from the cloud server and transmitted to the ONT, the OLT can also easily know how to increase the MIB data synchronization count; alternatively, when the OLT is self-controlled, the cloud server may determine the number of MEs configured by the cloud server and transmit the number of MEs to the OLT, so that the OLT can increase the MIB data synchronization count according to the number of MEs and the number of MEs configured by the OLT.

In some embodiments, the first apparatus 1 further comprises a first receiving means (not shown) and a second sending means (not shown). The first receiving means is used to receive an OMCI response message from the optical network terminal; the second sending means is used to obtain object identification information corresponding to the OMCI response message, and sends the OMCI response message to an object indicated by the object identification information according to the object identification information. The object identification information is used to identify an object to which the OMCI response message responds, and it should be understood that the object to which the OMCI response message responds is also the source of the request (OMCI message) corresponding to the OMCI response message, and in some embodiments, the object may be an OLT, a module or unit in an OLT, the cloud server or a module or unit in the cloud server; in some embodiments, if an OMCI message is generated by the OLT according to one or more management entities in the part of management entities in the OLT, the object indicated by object identification information corresponding to an OMCI response message received by the OLT for the OMCI message is the OLT or a certain module/unit in the OLT; in some embodiments, if an OMCI message is generated by the cloud server according to one or more management entities in the another part of the management entities in the cloud server, the object indicated by the object identification information corresponding to the OMCI response message received by the OLT for the OMCI message is the cloud server or a certain module/unit in the cloud server. In some embodiments, the second sending means extracts a transaction correlation identifier in the OMCI response message, and determines the transaction correlation identifier as the object identification information; the transaction correlation identifier (TCID) is a field in a message based on the OMCI protocol, and the value of this field in a set of corresponding request and response messages must be consistent, that is, an OMCI message and an OMCI response message for the OMCI message contain the same transaction correlation identifier, so that the OLT can determine, according to the transaction correlation identifier in the OMCI response message, whether the OMCI response message is a response to the OMCI message generated by the OLT or a response to the OMCI message generated by the cloud server, that is, the ONT can determine, according to the transaction correlation identifier in the OMCI response message, whether to send the OMCI response message to a corresponding unit of the OLT for processing or to send the OMCI response message to the cloud server for processing. In some embodiments, the second sending means extracts the object identification information from other fields of the OMCI response message except the TCID, if a new field is added to the OMCI response message format defined by the original OMCI protocol to characterize the object identification information, the content in the new field may be extracted from the received OMCI response message to obtain the object identification information, and if a field in the OMCI response message format defined by the original OMCI protocol is used to carry the object identification information, the object identification information carried by the field may be obtained from the field of the received OMCI response message. In some embodiments, the second sending means determines the object identification information based on information other than the OMCI response message, or obtains the object identification information from other elements in the OLT. It should be noted that, the above implementation manner for obtaining the object identification information is only examples and not a limitation of the present disclosure, and those skilled in the art should understand that any implementation manner used in the OLT for obtaining the object identification information corresponding to the OMCI response message to determine which object the OMCI response message should be sent to should be included in the scope of the present disclosure.

Figure 4:
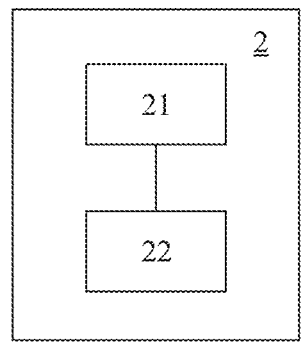
FIG. 4 shows a structural diagram of a second apparatus for transmitting OMCI messages in a cloud server according to an embodiment of the present disclosure.

FIG. 4 shows a structural diagram of a second apparatus for transmitting OMCI messages in a cloud server according to an embodiment of the present disclosure. Wherein, the optical line terminal comprises a part of management entities supported by the OMCI protocol, the part of management entities is associated with the device information of the optical line terminal, a cloud server supports the virtual OMCI and comprises another part of management entities supported by the OMCI protocol. Wherein, the cloud server and the optical line terminal are already described in detail in the embodiment shown in FIG. 3, and are not described herein again.

In this embodiment, the second apparatus 2 includes a first generating means 21 and a third sending means 22. The first generating means 21 is used to generate an OMCI message to be sent according to one or more management entities in said another part of management entities; the third sending means 22 is used to send the OMCI message to the optical line terminal.

The first generating means 21 is used to generate an OMCI message to be sent according to one or more of said another part of the management entities. Specifically, the first generating means 21, according to one or more management entities in said another part of management entities stored in the cloud server, obtains the content information corresponding to the one or more management entities and then encapsulates the content information according to the OMCI protocol format to obtain the OMCI message to be sent.

The third sending means 22 is used to send the OMCI message to the optical line terminal, so as to send the OMCI message to the optical network terminal through the optical line terminal.

In some embodiments, the second apparatus 2 further comprises a second generating means (not shown). The second generating means is used to generate OMCI control information and sends the OMCI control information to the optical line terminal, wherein the OMCI control information is used for indicating one or more management entities in the part of management entities which need to be sent, so that the optical line terminal generates OMCI messages to be sent according to the one or more management entities indicated by the OMCI control information. In these embodiments, the OMCI function in the optical line terminal is controlled by the cloud server, that is, which MEs in the part of the management entity in the OLT need to be sent and how to send are controlled by the cloud server. The OMCI control information is already described in detail in the foregoing embodiment, and is not described herein again. As one example, the second generating means generates OMCI control information for indicating to send ME1 and the sending frequency is f1; then the second generating means sends the OMCI control information to the OLT, so that the OLT generates an OMCI message comprising ME1 content according to the OMCI control information. Alternatively, the OMCI control information may be transmitted between the cloud server and the OLT based on any feasible manner, such as using RPC (Remote Procedure Call) as a channel, and in practical applications, the OMCI control information transmitted between the cloud server and the OLT may be designed based on practical requirements.

In some embodiments, when the OMCI function in the optical line terminal is controlled by the cloud server, the second apparatus 2 further includes a first synchronization means (not shown). The first synchronization means is used to control to increase the synchronous counting of MIB data according to the OMCI message and the OMCI control information sent from the cloud server to the optical line terminal. As an example, the first synchronization means determines a first ME number configured by the cloud server according to the OMCI message sent from the cloud server to the optical line terminal, and determines a second ME number configured by the OLT according to the OMCI control information sent to the OLT, and a total ME number sent to the ONT can be obtained by summing the first ME number and the second ME number, and then the first synchronization means can increase the synchronization count of MIB data based on the total ME number. It should be noted that, when the OMCI function in the optical line terminal is controlled by the cloud server, the synchronization count of MIB data may also be increased by the OLT, this implementation is already described in detail in the foregoing embodiment and will not be repeated here.

In some embodiments, the OLT is self-controlled, the second apparatus 2 further comprising a second receiving means (not shown) and a second synchronization means (not shown). The second receiving means is used to receive synchronization related information from the optical line terminal; the second synchronization means is used to control to increase the synchronous count of MIB data according to the OMCI message and the synchronous related information sent to the optical line terminal by the cloud server. The synchronization related information is already detailed in the foregoing embodiment, and will not described herein again. As an example, the second receiving means receives synchronization related information from the OLT, the synchronization related information is used for indicating that the number of MEs configured by the OLT and sent to the ONT is M1, the second synchronization means determines that the number of MEs configured by the cloud server and sent to the ONT is M2 according to the OMCI message sent to the OLT by the cloud server, and then the second synchronization means controls to increase the synchronization count of MIB data according to M1 and M2. It should be noted that, when the OLT is self-controlled, the synchronization count of MIB data may also be increased by the OLT, and this implementation is already described in detail in the foregoing embodiment, and will not described here again.

In some embodiments, the second apparatus 2 further comprises a third receiving means (not shown). The third receiving means is used to receive an OMCI response message sent by the optical line terminal, wherein an object indicated by the object identification information corresponding to the OMCI response message is the cloud server. The object identification information is already described in detail in the foregoing embodiment, and will not described herein again.

According to the scheme of the disclosure, by retaining a part of MEs supported by the OMCI protocol which is associated with the device information of OLT in OLT, and deploying another part of MEs supported by the OMCI protocol in the cloud server, it can reduce or avoid the dependency of the vOMCI on the OLT device while the vOMCI is realized to reduce the complexity of the OLT device and improve the flexibility of deploying the OMCI protocol stack of different service providers.

Figure 5:
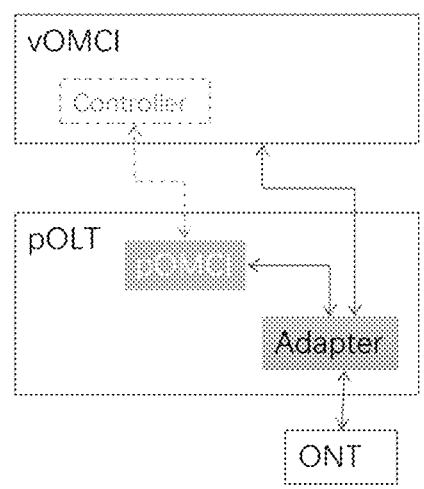
FIG. 5 shows a schematic diagram of a system architecture for transmitting OMCI messages according to an example of the present disclosure.

FIG. 5 shows a schematic diagram of a system architecture for transmitting OMCI messages according to an example of the present disclosure. The system includes an optical line terminal pOLT (physical OLT) (in this example, the pOLT is used to mark a physical OLT device), a cloud server (not shown), and an optical network terminal ONT. The cloud server includes a vOMCI module (the vOMCI module is also equivalent to the second apparatus described in the foregoing embodiment), and the vOMCI module is used for supporting the virtual OMCI function; the vOMCI module includes a Controller (the controller is equivalent to the above-mentioned second generating means which is used to generate the OMCI control information and send the generated OMCI control information to the pOLT); it should be noted that, for simplicity, FIG. 5 only shows the vOMCI module in the cloud server and some means or units included in the vOMCI module. The pOLT includes a pOMCI (Physical OMCI) module, the pOMCI module includes a part of management entities supported by the OMCI protocol, and the part of management entities is associated with the device information of the pOLT; the vOMCI module includes another part of management entities supported by the OMCI protocol. Wherein, the pOLT is further designed with an Adapter, the Adapter is configured to send the OMCI message from the vOMCI and the OMCI message from the pOMCI to the ONT, and send the received OMCI response message to the pOMCI module or the vOMCI module in the cloud server (the Adapter may determine whether to send the OMCI response message to the pOMCI module or the vOMCI module in the cloud server according to the transaction related identification in the OMCI response message from the ONT or other fields in the OMCI response message or other information besides the OMCI response message).

It should be noted that, for simplicity, FIG. 5 only shows some means or units in the pOLT, and the pOMCI and Adapter shown in FIG. 5 may implement all functions of one or more means in the first apparatus, or may implement part of the functions of one or more means in the first apparatus. It should be noted that, for simplicity, only one pOLT and one ONT connected to the pOLT are shown in the system shown in FIG. 5, and those skilled in the art will understand that the system may include a plurality of pOLTs, and each pOLT may be connected to a plurality of ONTs to manage and control the plurality of ONTs. It should be noted that in this embodiment, the OMCI function of the pOMCI is controlled by the vOMCI.

The following exemplary briefly describes the implementation of transmitting OMCI messages based on the system shown in FIG. 5: 1) the vOMCI configures one or more management entities deployed in the vOMCI, generates corresponding OMCI message, and sends the OMCI message to the Adapter in the pOLT, so that the OMCI message are sent to the ONT through the Adapter; and the ONT sends an OMCI response message for the OMCI message to the pOLT, the Adapter sends the OMCI response message to the vOMCI based on the TCID in the OMCI response message after receiving the OMCI response message. 2) The Controller in the vOMCI generates OMCI control information, the OMCI control information is used to indicate one or more management entities deployed in the pOMCI that need to be configured by the pOMCI and the sending manner of the one or more management entities, then the Controller in the vOMCI sends the generated OMCI control information to the pOMCI in the pOLT, the pOMCI determines which management entities need to be sent and how to send based on the received OMCI control information, and determines the content information of the one or more management entities to be sent in combination with the device information in the pOLT, and encapsulates the content information according to the OMCI protocol to obtain an OMCI message to be sent, then the pOMCI sends the generated OMCI message to the Adapter, so that the OMCI message is sent to the ONT through the Adapter; the ONT sends an OMCI response message for the OMCI message to the pOLT, the Adapter sends the OMCI response message to the pOMCI based on the TCID in the OMCI response message after receiving the OMCI response message.

Figure 6:
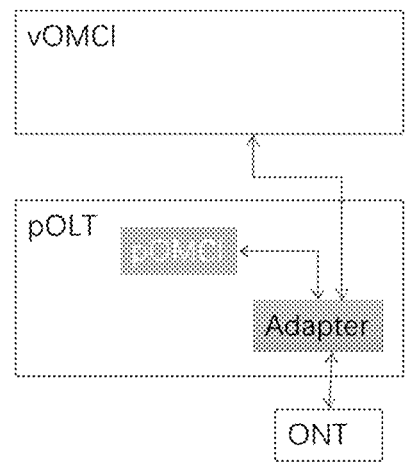
FIG. 6 shows a schematic diagram of a system architecture for transmitting OMCI messages according to another example of the present disclosure.

FIG. 6 shows a schematic diagram of a system architecture for transmitting OMCI messages according to another example of the present disclosure. The system includes an optical line terminal pOLT (physical OLT) (in this example, the pOLT is used to mark a physical OLT device), a cloud server (not shown), and an optical network terminal ONT. The cloud server includes a vOMCI module (the vOMCI module is also equivalent to the second apparatus described in the foregoing embodiment), and the vOMCI module is used for supporting the virtual OMCI function. The pOLT includes a pOMCI module, the pOMCI module includes a part of management entities supported by the OMCI protocol, and the part of management entities is associated with the device information of the pOLT; the vOMCI module includes another part of management entities supported by the OMCI protocol. Wherein, the pOLT is further designed with an Adapter, the Adapter is configured to send the OMCI message from the vOMCI and the OMCI message from the pOMCI to the ONT, and send the received OMCI response message to the pOMCI module or the vOMCI module in the cloud server (the Adapter may determine whether to send the OMCI response message to the pOMCI module or the vOMCI module in the cloud server according to the transaction related identification in the OMCI response message from the ONT or other fields in the OMCI response message or other information besides the OMCI response message). It should be noted that, for simplicity, FIG. 6 only shows some means or units in the pOLT, and the pOMCI and Adapter shown in FIG. 6 may implement all functions of one or more means in the first apparatus, or may implement part of the functions of one or more means in the first apparatus. It should be noted that, for simplicity, only one pOLT and one ONT connected to the pOLT are shown in the system shown in FIG. 6, and those skilled in the art will understand that the system may include a plurality of pOLTs, and each pOLT may be connected to a plurality of ONTs to manage and control the plurality of ONTs. It should be noted that the pOMCI in this embodiment is self-controlled, that is, the pOMCI itself controls which management entities of the part of management entities need to be sent and how to send.

The following exemplary briefly describes the implementation of transmitting OMCI messages based on the system shown in FIG. 6: 1) the vOMCI configures one or more management entities deployed in the vOMCI, generates corresponding OMCI message, and sends the OMCI message to the Adapter in the pOLT, so that the OMCI messages are sent to the ONT through the Adapter; and the ONT sends an OMCI response message for the OMCI message to the pOLT, and the Adapter sends the OMCI response message to the vOMCI based on the TCID in the OMCI response message after receiving the OMCI response message. 2) The pOMCI obtains OMCI control information (such as management messages from other protocol stacks or control information obtained through a private negotiation manner) from other modules in the pOLT, the OMCI control information is used to indicate one or more management entities deployed in the pOMCI that need to be configured by the pOMCI and the sending manner of the one or more management entities, then the pOMCI determines which management entities need to be sent and how to send based on the OMCI control information, and determines the content information of the one or more management entities to be sent in combination with the device information in the pOLT, and encapsulates the content information according to the OMCI protocol to obtain an OMCI message to be sent, then the pOMCI sends the generated OMCI message to the Adapter, so that the OMCI message is sent to the ONT through the Adapter; the ONT sends an OMCI response message for the OMCI message to the pOLT, the Adapter sends the OMCI response message to the pOMCI based on the TCID in the OMCI response message after receiving the OMCI response message.

It should be noted that the system to which the technical solution of the present disclosure is applicable may be a GPON system or a next-generation passive optical network (such as XGPON), or any other passive optical network system that adopts OMCI mode for management and control.

Figure 7:
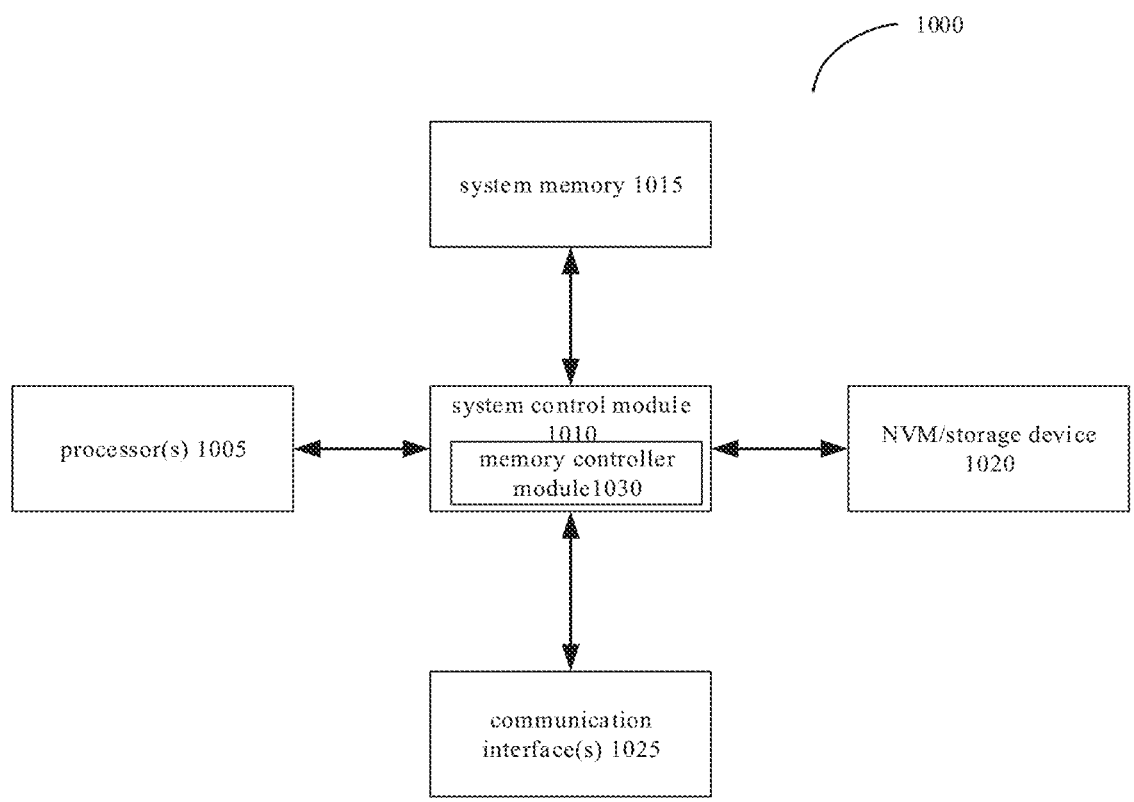
FIG. 7 shows an exemplary system that can be used to implement the various embodiments described in the present disclosure.

FIG. 7 shows an exemplary system that can be used to implement the various embodiments described in the present disclosure.

In some embodiments, the system 1000 can be used as any processing device in the embodiments of the present disclosure. In some embodiments, system 1000 may include one or more computer readable media (e.g., system memory or NVM/storage device 1020) having instructions and one or more processors (e.g., processor(s) 1005) coupled with the one or more computer readable media and configured to execute the instructions to implement modules to perform the actions described in the present disclosure.

For one embodiment, system control module 1010 may include any suitable interface controller to provide any suitable interface to at least one of processor(s) 1005 and/or to any suitable device or component in communication with system control module 1010.

The system control module 1010 may include a memory controller module 1030 to provide an interface to the system memory 1015. Memory controller module 1030 may be a hardware module, a software module, and/or a firmware module.

System memory 1015 may be used to load and store data and/or instructions, for example, for system 1000. For one embodiment, system memory 1015 may include any suitable volatile memory, such as suitable DRAM. In some embodiments, system memory 1015 may include a Double Data Rate type Fourth Synchronous Dynamic Random Access Memory (DDR4 SDRAM).

For one embodiment, system control module 1010 may include one or more input/output (I/O) controllers to provide an interface to NVM/storage device 1020 and communication interface(s) 1025.

For example, NVM/storage device 1020 may be used to store data and/or instructions. NVM/storage device 1020 may include any suitable non-volatile memory (e.g., flash memory) and/or may include any suitable non-volatile storage device(s) (e.g., one or more hard disk drives (HDD), one or more Compact Disc (CD) drives, and/or one or more Digital Versatile Disc (DVD) drives).

NVM/storage device 1020 may include storage resources that are physically part of the device on which system 1000 is installed, or it may be accessible by the device and not necessarily to be part of the device. For example, NVM/storage device 1020 may be accessed via the communication interface(s) 1025 through the network.

Communication interface(s) 1025 may provide an interface for system 1000 to communicate via one or more networks and/or with any other suitable devices. System 1000 may wirelessly communicate with one or more components of a wireless network according to any of one or more wireless network standards and/or protocols.

For one embodiment, at least one of the processor(s) 1005 may be packaged together with logic for one or more controller(s) (e.g., memory controller module 1030) of the system control module 1010. For one embodiment, at least one of the processor(s) 1005 may be packaged together with logic for one or more controller(s) of the system control module 1010 to form a System in Package (SiP). For one embodiment, at least one of the processor(s) 1005 may be integrated with logic for one or more controller(s) of the system control module 1010 on the same mold. For one embodiment, at least one of the processor(s) 1005 may be integrated with logic for one or more controller(s) of system control module 1010 on the same mold to form a system on chip (SoC).

In various embodiments, the system 1000 may be, but is not limited to being: a server, a workstation, a desktop computing device, or a mobile computing device (for example, a laptop computing device, a handheld computing device, a tablet, a netbook, etc.). In various embodiments, the system 1000 may have more or fewer components and/or different architectures. For example, in some embodiments, the system 1000 includes one or more cameras, a keyboard, a Liquid Crystal Display (LCD) screen (including a touch screen display), a non-volatile memory port, multiple antennas, a graphics chip, an Application Specific Integrated Circuit (ASIC), and speakers.

The present disclosure also provides a device, wherein the device comprising:

a memory for storing one or more programs;

one or more processors connected with the memory, the one or more programs, when executed by the one or more processors, cause the one or more processors to execute the method for transmitting OMCI messages described in the present a disclosure.

The present disclosure also provides a computer readable storage medium storing a computer program, which when executed by a processor, cause the processor to perform the method for transmitting OMCI messages described in the present disclosure.

The present disclosure also provides a computer program product, which when executed by a device, cause the device to perform the method for transmitting OMCI messages described in the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/ including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically shown and described above, those skilled in the art will appreciate that there may be changes in their form and details without departing from the spirit or scope of the claims. The protection sought herein is described in the appended claims.

The invention claimed is:

1. A method for transmitting Optical Network Unit Management and Control Interface (OMCI) messages in an optical line terminal,
wherein the optical line terminal comprises a part of management entities supported by OMCI protocol, the part of management entities is associated with device information of the optical line terminal, a cloud server supports virtual OMCI, the cloud server comprises another part of management entities supported by the OMCI protocol, the method comprises:

obtaining an OMCI message to be sent, wherein the OMCI message is generated by the optical line terminal according to one or more management entities in the part of management entities, or the OMCI message is generated by the cloud server according to one or more management entities in the another part of management entities;

sending the OMCI message to an optical network terminal;

receiving an OMCI response message from the optical network terminal; and obtaining object identification information corresponding to the OMCI response message, and sending the OMCI response message to an object indicated by the object identification information according to the object identification information.

2. The method of claim 1, wherein the obtaining the OMCI message to be sent comprises:
obtaining OMCI control information, wherein the OMCI control information is used for indicating one or more management entities in the part of management entities; and
generating an OMCI message to be sent according to the one or more management entities indicated by the OMCI control information.

3. The method of claim 2, wherein the obtaining OMCI control information comprises:
receiving OMCI control information from the cloud server.

4. The method of claim 2, wherein the obtaining OMCI control information comprises:
obtaining OMCI control information provided by other protocols except the OMCI protocol in the optical line terminal; or
obtaining OMCI control information prestored in the optical line terminal.

5. The method of claim 4, wherein increasing a synchronization count of Management Information Base (MIB) data is controlled by the cloud server, the method further comprising:
generating synchronization related information according to the OMCI control information, and sending the synchronization related information to the cloud server.

6. A device, wherein the device comprising:
a memory for storing one or more programs; and
one or more processors connected with the memory,
the one or more programs, when executed by the one or more processors, cause the one or more processors to execute the method according to claim 1.

7. A method in a cloud server for transmitting an Optical Network Unit Management and Control Interface (OMCI) message, wherein an optical line terminal comprises a part of management entities supported by OMCI protocol, the part of management entities is associated with device information of the optical line terminal, the cloud server supports virtual OMCI, and the cloud server comprises another part of management entities supported by the OMCI protocol, the method comprises:
generating an OMCI message to be sent according to one or more management entities in the another part of management entities;
sending the OMCI message to the optical line terminal; and
receiving an OMCI response message sent by the optical line terminal, wherein an object indicated by object identification information corresponding to the OMCI response message is the cloud server.

8. The method of claim 7, wherein the method further comprises:
generating OMCI control information; and
sending the OMCI control information to the optical line terminal, wherein the OMCI control information is used for indicating one or more management entities in the part of management entities, so that the optical line terminal generates the OMCI message to be sent according to the one or more management entities indicated by the OMCI control information.

9. The method of claim 7, wherein the method further comprises:
receiving synchronization related information from the optical line terminal; and
controlling to increase a synchronous count of Management Information Base (MIB) data according to the OMCI message and the synchronous related information sent to the optical line terminal by the cloud server.

10. A non-transitory computer readable storage medium storing a computer program, which when executed by a processor, causes the processor to perform the method according to claim 1.

11. A first apparatus for transmitting Optical Network Unit Management and Control Interface (OMCI) messages in an optical line terminal, wherein the optical line terminal comprises a part of management entities supported by OMCI protocol, the part of management entities is associated with device information of the optical line terminal, a cloud server supports virtual OMCI, the cloud server comprises another part of management entities supported by the OMCI protocol, the first apparatus comprising:
at least one processor and at least one memory including computer program code, the at least one memory and computer program code configured to, with the at least one processor, cause the first apparatus to
obtain an OMCI message to be sent, wherein the OMCI message is generated by the optical line terminal according to one or more management entities in the part of management entities, or the OMCI message is generated by the cloud server according to one or more management entities in the another part of management entities;
send the OMCI message to an optical network terminal;
receive an OMCI response message from the optical network terminal; and
obtain object identification information corresponding to the OMCI response message, and send the OMCI response message to an object indicated by the object identification information according to the object identification information.

12. A second apparatus in a cloud server for transmitting an Optical Network Unit Management and Control Interface (OMCI) message, wherein an optical line terminal comprises a part of management entities supported by OMCI protocol, the part of management entities is associated with device information of the optical line terminal, the cloud server supports virtual OMCI, and the cloud server comprises another part of management entities supported by the OMCI protocol, the second apparatus comprising:
at least one processor and at least one memory including computer program code, the at least one memory and computer program code configured to, with the at least one processor, cause the second apparatus to
generate an OMCI message to be sent according to one or more management entities in the another part of management entities;
send the OMCI message to the optical line terminal; and receive an OMCI response message sent by the optical line terminal, wherein an object indicated by object identification information corresponding to the OMCI response message is the cloud server.

* * * * *